April 7, 1936.
H. E. ALTGELT
2,036,670
TRACTOR GOVERNOR CONTROL
Filed Feb. 4, 1933
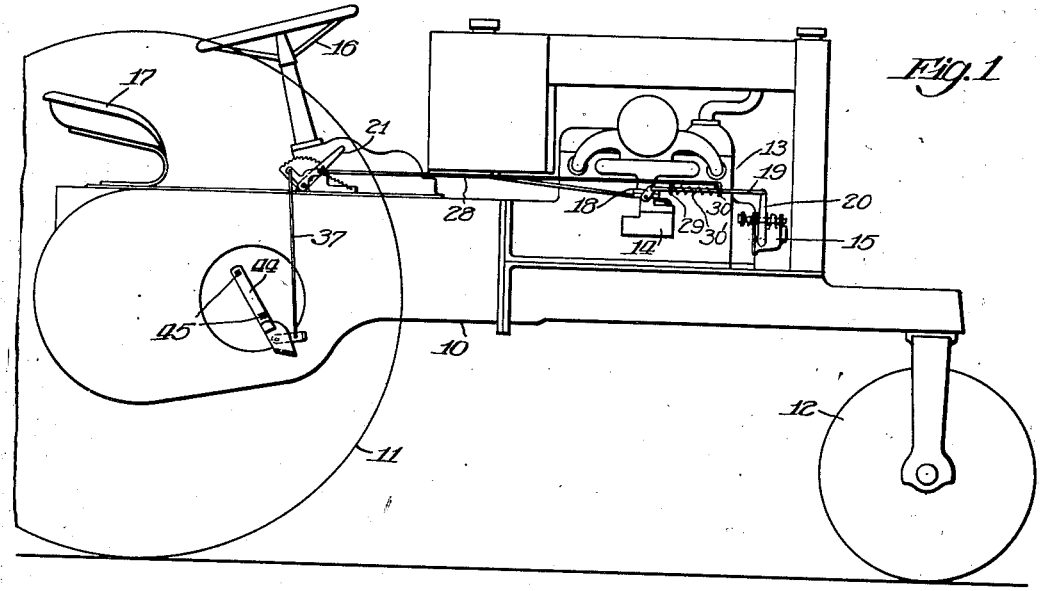
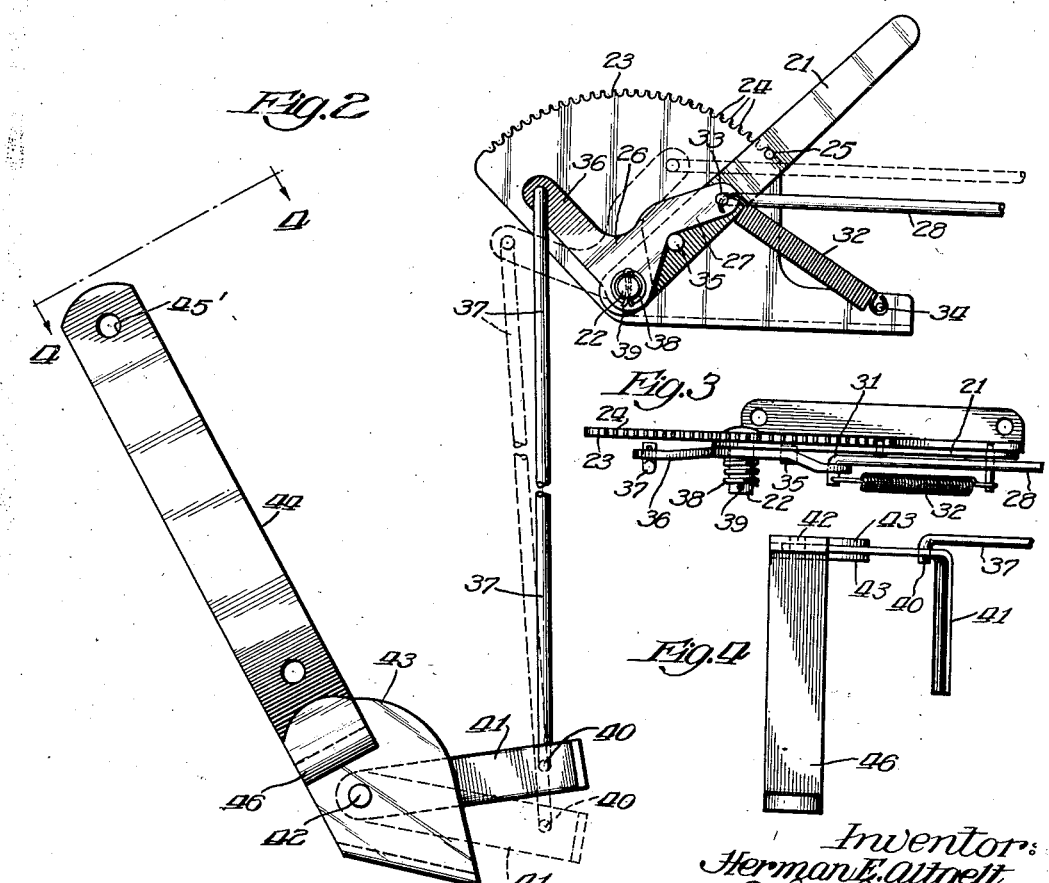
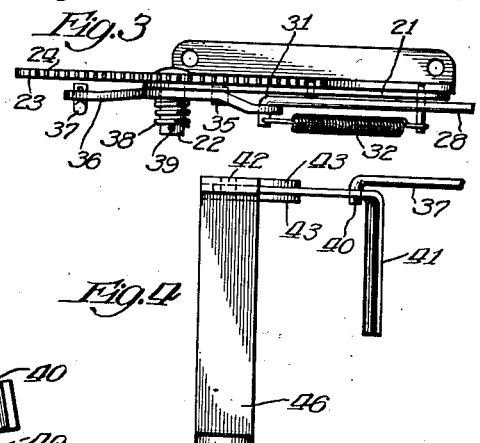
Inventor:
Herman E. Altgelt
By John P. Smith Atty.

Patented Apr. 7, 1936

2,036,670

UNITED STATES PATENT OFFICE 2,036,670

TRACTOR GOVERNOR CONTROL

Herman E. Altgelt, South Bend, Ind., assignor to Oliver Farm Equipment Company, a corporation of Delaware Application February 4, 1933, Serial No. 655,288

7 Claims. (Cl. 123—98)

The present invention is directed generally to a tractor governor control, but more particularly to an auxiliary foot control mechanism for reducing the speed of the tractor which is essential under certain conditions and which permits the tractor to return to its normal speed after such conditions have passed.

Experience has shown that in applying brakes to one or the other of the rear traction wheels of a tractor that on account of the action of the differential mechanism when making a turn of the tractor, the traction wheel on the outside of the turn is caused to travel at a greatly increased speed causing the rear end of the tractor to whip on the turn and in many instances causing breakage to implements carried by or drawn at the rear of the tractor. Operators of tractors have found it expedient to cause the clutch to slip to overcome this difficulty and in a similar manner to slow down the tractor when crossing ditches in the field or railroad tracks and so forth, to slow the speed of the tractor. This practice, however, wears the clutch and requires frequent repairs. It is therefore, a primary object of the present invention to provide a convenient means of a foot control operatively connected with the governor whereby, on the depression of the foot treadle mechanism, the speed of the governor is reduced and upon the release of the foot treadle the tractor is returned to its normal speed or the speed which has been predeterminately set by the hand throttle.

Another object of the invention is to provide a novel and improved auxiliary foot control which is cooperatively connected with the hand throttle so that when the operator desires to reduce the speed upon a sharp turn of the tractor at the end of the field or reducing the speed of the tractor when crossing ditches or railroad tracks and so forth, this may be readily accomplished by depressing a foot lever temporarily and upon the release of the foot lever the normal speed forward of the tractor is then resumed.

These and other objects are accomplished by providing a construction and arrangement of the various parts in the manner hereinafter described and particularly pointed out in the appended claims.

Referring to the drawing:

Fig. 1 is a side elevational view of the conventional form of tractor showing my improved auxiliary governor control embodied therein;

Fig. 2 is an enlarged fragmentary view of the auxiliary foot control showing the manner in which it is connected up with the hand throttle;

Fig. 3 is a top plan view of the hand operated throttle and its associated parts; and Fig. 4 is a view of the foot control taken on the lines 4—4 in Fig. 2.

In illustrating one form of my invention, I have shown the same in connection with the conventional form of tractor generally indicated by the reference character 10, which includes the rear traction wheels 11, and front steering wheel 12. Mounted on the frame of the tractor is the usual motor, generally indicated by the reference character 13, which in turn is provided with the usual carburetor 14, and conventional form of governor 15. The tractor is also provided with the usual steering wheel mechanism generally indicated by the reference character 16, and tractor operator's seat 17. The carburetor 14 is provided with the usual fly valve (not shown), which in turn is operated by a crank 18, the free end of which is connected by a connecting rod 19 to the governor control lever 20. The carburetor in this instance is the conventional form of carburetor, and the governor is the conventional form of governor. The essential feature of the present invention consists in a novel connection in which the hand throttle is operatively connected up with the connection between the carburetor and governor and an auxiliary foot lever for reducing the speed under the conditions heretofore described. Mounted adjacent the steering wheel 16 and within easy reach of the operator on the tractor seat 17, is a hand operating lever 21 which is pivoted on a bolt 22 extending through an aperture in a sector bracket 23 secured to the frame. The sector bracket is provided with an arcuately arranged set of teeth 24 in which a laterally projecting pin 25 is adapted to lock the lever in various positions of adjustment for regulating or controlling the governor or speed of the motor. Mounted concentrically with the lever 21 and on the bolt 22 is a bell crank lever generally indicated by the reference character 26. This bell crank lever has a forwardly curved and offset arm 27 which has its free end connected by means of a rod 28 to the connecting rod 19. The forward end of the rod 28 has a right angularly bent eye 30 which surrounds the rod 19. Positioned between the eye 30 of the rod 28 and a washer and cotter 29 mounted on the rod 19 is a compression spring 30'. The rear end of the rod 28 is bent at right angles, as shown at 31, and extends through an opening in the free end of the arm 27 of the bell crank lever 26. One end of a spring 32 is hooked into an aperture, as shown at 33, of the right angularly bent portion of the rod 28 for securing it to the lever and the other end of the spring is secured to a pin 34 attached to one end of the sector bracket 23. The bell crank lever 26 is stopped in its movement in one direction relative to the lever 21 by a pin 35 which is secured to the lever 21. The bell crank 26 is provided with a rearwardly extending arm 36 to the free end of which is pivotally connected a downwardly extending connecting rod 37. The lever 21 is held yieldingly against the side of the sector 23 with the bell crank on the bolt 22 by a pressure spring 38 mounted on the bolt 22, which has one end thereof contacting the bell crank and the other end thereof contacting a cotter 39 which retains the spring on the bolt 22. This arrangement permits the lever 21 to be deflected laterally compressing the spring 38 so as to permit the pin 25 to become disengaged from the sector teeth 24 when adjusting the lever for securing different speeds of the engine. The lower end of the connecting rod 37 is pivotally connected, as shown at 40, to the free end of a foot treadle 41, which in turn has its rear end pivotally connected, as shown at 42, between two spaced apart plates 43. The plates 43 are secured to a foot bracket 44 which in turn is secured to the side of the tractor by means of bolts 45 which extend through aperture 45'. The foot bracket is provided with a right angularly set portion 46 which forms the foot rest for one of the feet of the operator.

My improved auxiliary governor control operates as follows:

Let us assume that the governor is set with the lever 21 in the extreme forward position so that the motor maximum speed is 1500 R. P. M. Also let us assume that the operator of the tractor wishes to reduce the speed on account of making a turn or crossing a ditch, the operator depresses the lever 41 from the full line position to the dotted line position shown in Fig. 2. In doing so, the bell crank lever 26 is moved from its full line position to its dotted line position, during which time the lever 21 remains in place. The bell crank lever 26 moves rearwardly, the connecting rod 28 moves rearwardly compressing the spring 30 and actuating the connecting rod 19 between the governor lever 20 and fly valve crank 18 so as to reduce the speed from which it was previously set. As soon as the tractor has made the turn or crossed the ditch as the case may be, the foot pressure on the foot treadle 41 is released and the spring 32 returns the bell crank 26, and particularly the arm 27 into contacting relation with the pin 35 on the lever 21, thereby permitting the tractor to assume its normal forward speed or the speed previously set. It will of course be understood, that the lever 21 may be adjusted to its various positions of adjustment on the sector 23 so that a slower normal forward speed may be obtained, which is particularly desirable for cultivating small plants in order to prevent covering them with soil or to protect plows against breakage when working in stony fields. It will also be understood that of course when the tractor is travelling at a slower speed, the auxiliary foot control may still be manipulated to reduce the speed at the turns or when crossing ditches and permit it to assume its normal forward speed after the turn has been made or the ditch crossed.

While in the above specification I have described one embodiment which my invention may assume in practice, it will of course be understood that the same is capable of modification and that modification may be made without departing from the spirit and scope of the invention as expressed in the following claims:

What I claim as my invention and desire to secure by Letters Patent is:

1. In combination with a tractor, of an internal combustion engine therefor, a carburetor for said engine, a governor for controlling said carburetor, a hand operated lever for regulating said governor and setting a predetermined speed for said engine, a foot lever operatively connected with said hand lever and independent of the tractor clutch whereby the speed of said engine may be reduced by operating said foot lever, and a spring operatively connected to said foot lever for returning the same to the position set by said hand lever by releasing said foot lever.

2. In combination with a tractor, of an internal combustion engine therefor, a carburetor for said engine, a governor for said carburetor, a connection between said governor and said carburetor, a hand-operating lever cooperatively connected to the connection between said carburetor and said governor, means for locking said lever in various positions of adjustment for setting the speed of said engine at a predetermined number of revolutions per minute, and a foot operating lever operatively connected with said hand lever for reducing the speed of said engine below the speed set by said hand lever.

3. In combination with a tractor, of an internal combustion engine therefor, a carburetor for said engine, a governor for said carburetor, a connection between said governor and said carburetor, a hand operating lever cooperatively connected with said governor, means for locking said lever in various positions of adjustment for setting the speed of said engine at a predetermined number of revolutions per minute, a foot operating lever operatively connected with said hand lever for reducing the speed of said engine below the speed set by said hand lever, and means for normally returning said foot operating lever to return the speed of said engine to the speed normally set by said hand operating lever.

4. In combination with a tractor, of an internal combustion engine therefor, a carburetor for said engine, a governor operatively connected with said carburetor for controlling the same, a hand operating lever for setting the speed of said engine at a predetermined number of revolutions per minute, an independent auxiliary foot control operatively connected with said hand lever whereby the number of revolutions of said engine may be reduced, and means for automatically returning the speed of said engine to the speed previously set by said hand lever.

5. An engine governor control for a tractor comprising a lever pivoted to said tractor and operatively connected with said governor for setting a predetermined speed for said engine, a bell crank pivoted concentric with said hand lever and adapted to move relatively thereto, a pin secured to said lever and adapted to engage one of the arms of said bell crank, a spring normally pressing said bell crank against the pin on said lever, and a foot treadle operatively connected to said bell crank whereby the speed of said engine may be reduced by depressing said foot treadle and automatically return to its predetermined speed by releasing said foot treadle.

6. An engine governor control for a tractor comprising a hand lever pivoted to said tractor, a bell crank pivoted on a common pivot with said lever, a rod connecting said bell crank with the connection between said governor and carburetor, a laterally projecting pin on said hand lever, a spring normally urging said bell crank against said pin, and a foot operating lever mounted on said tractor and having a connection extending therefrom to said bell crank whereby on the manipulation of said foot lever the speed of said engine is reduced below the speed normally set by said hand lever and normally returned to its predetermined speed by releasing said foot lever.

7. An engine governor control for a tractor comprising a manually controlled means for regulating said governor for setting a predetermined speed for said engine, an auxiliary manually controlled means connected to said first named means for reducing the speed of said engine below the speed set by said first named means, and means for automatically returning said auxiliary control to the position set by said first named control.

HERMAN E. ALTGELT.